Jan. 8, 1929.
J B. GREEN
1,697,864
METALLIC ARC WELDING
Filed May 1, 1926   2 Sheets-Sheet 1
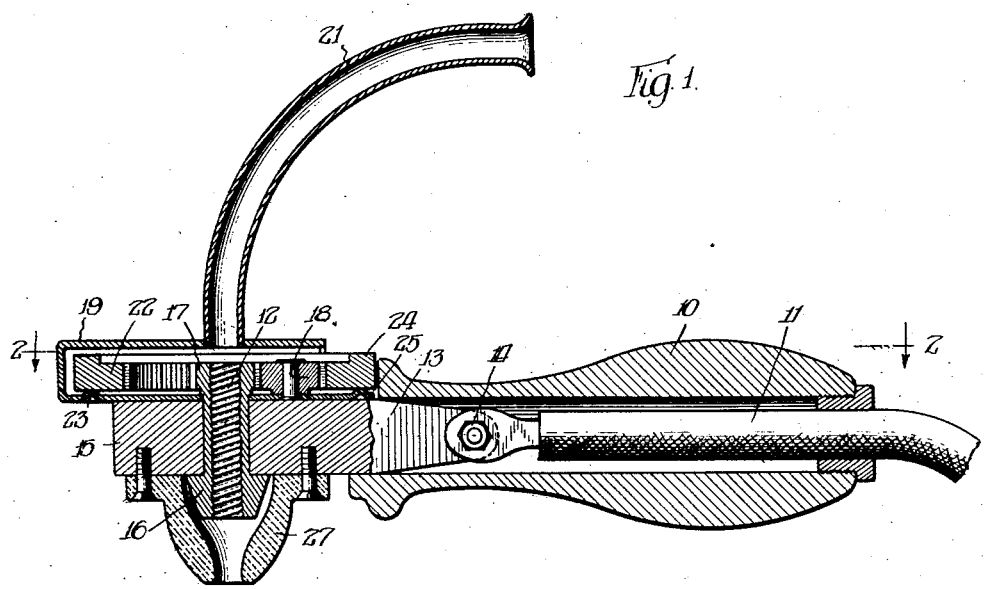
Fig. 1.
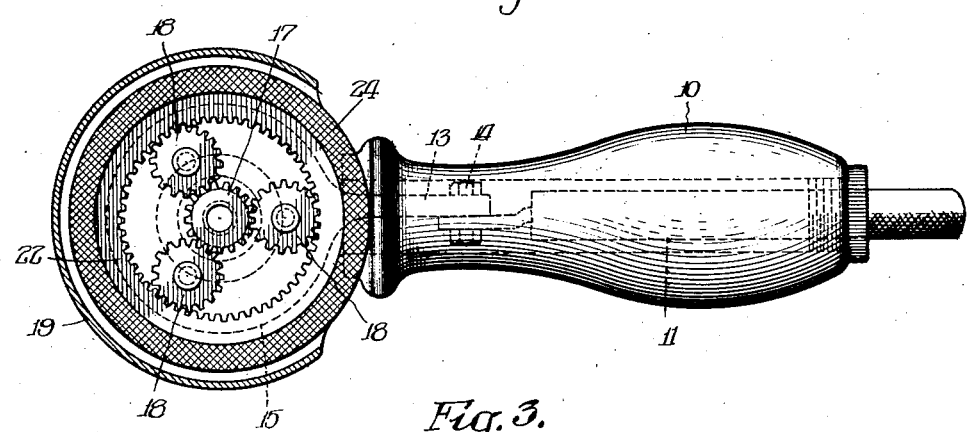
Fig. 2.
Fig. 3.
Witness:
R. Burkhardt
Inventor:
J. Birchard Green,
By Cromwell, Greist & Warden
Attys.

Jan. 8, 1929.

J B. GREEN 1,697,864

METALLIC ARC WELDING

Filed May 1, 1926

Inventor:
J Birchard Green,
By Cromwell, Greist & Warden
attys.

Patented Jan. 8, 1929.

1,697,864

UNITED STATES PATENT OFFICE.

J BIRCHARD GREEN, OF CHICAGO, ILLINOIS, ASSIGNOR TO CHICAGO STEEL & WIRE COMPANY, OF CHICAGO, ILLINOIS, A CORPORATION OF ILLINOIS.

METALLIC ARC WELDING.

Application filed May 1, 1926. Serial No. 105,924.

The invention here presented relates to metallic arc welding and provides a process and apparatus for increasing the speed and ease of the operation and the reliability of the weld. More specifically the invention relates to portable hand tools used by the operator for forming welds on the work where located, to methods whereby the range of use of said tools is greatly widened and to a process which will extend the employment of metallic arc welding to fields not hitherto considered attainable. Generally stated, the advances in the art attributable to the invention are accomplished by the application of higher currents than heretofore have been used and by a novel method and means whereby this higher current may be applied without destructive results.

Heretofore the practice has been to limit the current to a value below which the electrode would be melted in its entirety through resistance heating. Obviously, it is impractical to apply a current of such high value, and in such manner, as to make impossible the gradual feeding of the electrode and the corresponding building up of the weld. On the other hand, it is of great advantage to be able to speed up the deposit of weld metal and I have discovered that there are very important advantages in employing and applying current values higher than those which would fuse the electrode in its entirety. These higher current values might properly be called superfusion currents, and, to distinguish the welding done with these extreme currents by the process herein disclosed, I shall refer thereto as superfusion welding.

I have established that for any given set of conditions, the melting rate of electrodes varies directly with the current, also that penetration is affected by the current. One factor in the mathematical equation expressing the law of penetration in metallic arc welding is the radiation coefficient. Penetration occurs only when the base metal is heated to its fusion temperature. The base metal, and to some extent the air, tend to carry away, or radiate, the heat produced by the arc. It is impossible to heat more than a relatively small quantity of the base metal above its fusion temperature because usually the welding zone is surrounded by relatively large quantities of metal. This means that the temperature gradient is fairly constant, the extremes of this gradient being the fusion temperature of the metal on the one hand and room temperature on the other. Radiation thus proceeds at a fairly constant rate. Now if heat be added at exactly the same rate no penetration will occur, but if added at a greater rate, penetration will take place, and the greater the rate, the greater the penetration. Thus by increasing the current, penetration is increased. With deep penetration, relatively heavy sections can be welded without chamfering the edges, as in present practice, welds can be made with one passage of the electrode, which at the lower currents require several passages, as in multiple layer welding, and so much of the base metal is made liquid that it remains in a state of fusion long enough to permit slag and gas bubbles to float to the top, thus making the weld dependably sound. Furthermore, it is customary to incorporate certain materials with the electrode to throw a preponderance of heat to the work in direct current welding, but in ordinary practice this slows down the melting rate of the electrode to such an extent that the labor cost of welding becomes prohibitive on many classes of work. Superfusion welding makes it possible to compensate for this and to permit the use of the proper associated electrode materials for welding still heavier sections.

I do not yet know what are the limits of achievement by superfusion welding, but the uniformly dependable character of the welds, so produced, the increase in the size of sections which can be so welded, the better workmanship and the saving in labor due to increased speed of deposit, together with the saving in both labor and material by elimination of chamfering, are such strikingly important and desirable advantages as to indicate that I have discovered a new art in the field of joinery of metals.

With these considerations in mind it may be said that the principal object of the invention is to provide a process and apparatus for the practical application of superfusion welding. In order that the invention may be fully comprehended, I present herewith drawings of one form of apparatus adapted to be employed in carrying out the process of the invention and in applying the same to practical use. It will immediately occur to those skilled in the art, and it is conceded, that many other devices may be designed and employed for practicing the invention, and I have in mind several modifications of the present apparatus which seem to be more desirable for particular kinds of work. Let it be understood that the disclosure of the present form of apparatus is for purposes of exemplification and is not to be considered as having any limiting effect upon the claims which I make, also that I intend to dominate all substitute, modified and alternative devices incorporating all, or any part, of this invention.

In the drawings:

Fig. 1 is a vertical sectional view disclosing the details of construction and assembly of the tool;

Fig. 2 is a horizontal sectional view taken along the line 2—2 of Fig. 1,

Fig. 3 is a view of an electrode suitable for use with the tool.

Figure 4:
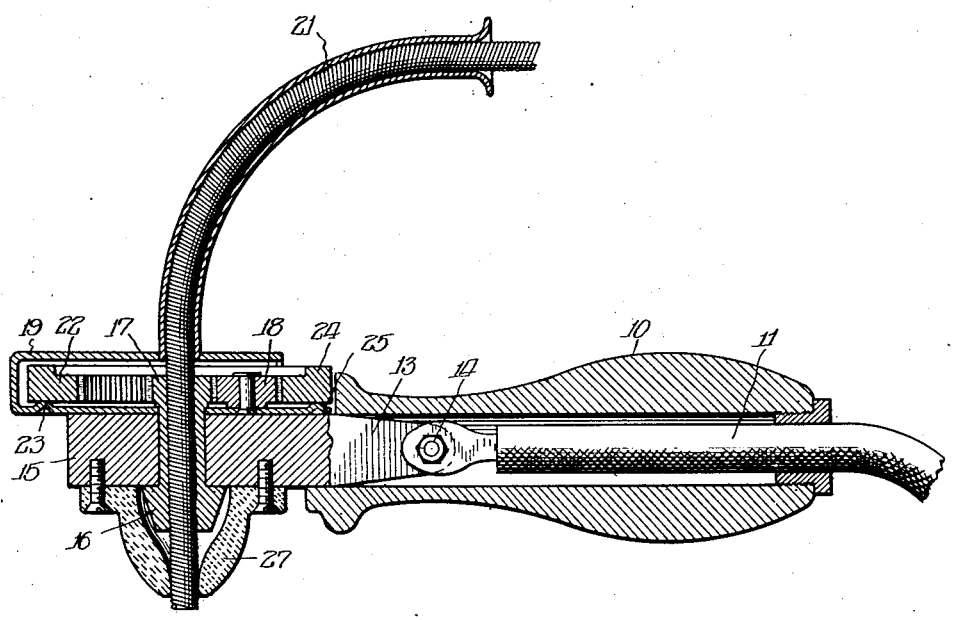
Fig. 4 is a vertical sectional view through the tool showing the electrode in association therewith.

As to detail, it will be seen from the drawings that the apparatus of the invention is a hand tool, provided with a handle portion 10, longitudinally and centrally bored to receive one end of a conductor cable 11, which latter is the source of electrical current to be applied to an electrode 12. Contact between the cable and a contactor 13 is maintained by a suitable nut and bolt connection 14. The contactor 13 projects from the forward end of the handle 10, the projecting portion thereof consisting of an annular, solid, metal member 15, the diameter of the vertical central opening therethrough being such as to closely fit and firmly press upon the shank portion of a revolving nut 16.

The nut 16 is internally threaded at 12 to engage and to feed an electrode such as that shown in Fig. 3, which electrode preferably is flexible and of the type disclosed in my copending application Serial No. 105,923, filed on even date herewith.

The upper end of the nut 16 terminates in a spur gear 17, which is in mesh with three intermediate spur gears 18, the latter being carried by, and housed within, a shield member 19, which in turn is fixedly secured to the projecting portion of the contactor 15. The shield is provided with aligned openings, coinciding with the bore of the nut 16.

A feed tube 21, is mounted on the upper portion of the shield 19, and covers the opening therein. This tube is curved toward the handle portion of the tool to facilitate introduction of the electrode and to assist in preventing axial rotation of the same.

An annular spur gear 22, is supported within the shield 19, upon an annular rib 23, formed in the bottom portion of the shield. Upon the upper surface of the gear member 22, a raised rim 24 is provided, the top face of which is knurled and is accessible to the operator. The handle 10, together with the adjacent section of the upper portion of the shield 19, is cut away at 25, to leave the rim 24 partially exposed, and this enables the operator to reach the same with the thumb of the hand which grasps the handle.

The inner periphery of the spur gear 22 is geared to mesh with the intermediate gears 18, and upon movement thereof by the thumb of the operator, applied to the knurled flange 24, rotation is imparted to the nut 16 and a corresponding feeding of the electrode 12, toward the work, results.

A heat insulating and refractory nozzle 27 is attached to the lower surface of the contactor 15 and protects the adjacent parts from the heat of the arc. It will be apparent that the electrode as it is fed through the revolving nut projects through the nozzle and that the arc is maintained immediately beyond the opening of the latter.

It will be observed that the current passes through only a short section of the electrode, at the end thereof which is in proximity to the work. This makes it possible to employ current values in excess of that which will melt the electrode, and the penetration, to which I have referred, can be brought about more effectively where the resistance offered by the electrode is so minimized. Heretofore, it has been the general rule to pass the current through a much longer section of the electrode, consequently, the higher currents I contemplate have not been employed.

The apparatus which I have devised for carrying the process into operation is light, well balanced and suitably arranged, so that the operator can traverse the area to be welded, rapidly, steadily and without frequent rest periods. It is a relatively simple matter to provide automatic means for feeding the electrode, and there are other refinements of the apparatus and process which I have worked out, and are to be made the subject matter of additional applications for patent.

I claim:

1. In apparatus for use in metallic arc welding processes, the combination with an electrode having a threaded surface, of means coacting with said surface for feeding the electrode to the work.

2. In apparatus for use in metallic arc welding processes, the combination with an electrode having a threaded surface, of a revolving nut coacting with said surface for feeding the electrode to the work.

3. In apparatus for use in metallic arc welding, the combination with a flexible electrode having a threaded surface, of a curved supply tube for introducing the electrode, and a revolving member coacting with said threaded surface for passing the electrode through the apparatus and feeding it to the work.

4. A tool for use in metallic arc welding having a handle, a contactor extending from the handle, an electrode passing through the contactor, and means intermediate the contactor and electrode for applying the current and feeding the electrode to the work.

5. A tool for use in metallic arc welding having a handle, a contactor extending from the handle, an electrode passing through the contactor, means intermediate said contactor and electrode for applying the current and feeding the electrode to the work, and means controllable from the handle for actuating the feeding means.

6. A tool for use in metallic arc welding having a handle, current conducting means associated with said handle and adapted to engage and to feed an electrode toward the work, and means controllable from the handle for actuating said conducting means.

7. A tool for use in metallic arc welding having a handle, current conducting means associated with said handle and adapted to engage the forward end of an electrode and to feed the same to the work, and means controllable from the handle for actuating said conducting means.

8. In apparatus for use in metallic arc welding, the combination with an electrode having a threaded surface, of a feeding member having a surface adapted to engage with the threaded surface on the forward end of said electrode and to pull it through the apparatus toward the work.

9. In apparatus for use in metallic arc welding, the combination with an electrode having a threaded surface, of a current conducting member having a surface adapted to engage with the threaded surface on the forward end of said electrode and to pass an electric current therethrough to the work as it feeds the electrode through the apparatus.

In testimony whereof I have hereunto subscribed my name.

J BIRCHARD GREEN.